DIBASIC ALUMINUM HISTIDINATE

Franco Parisi, Pavia, Franco Faustini, Milan, and Lavinio Canavesi, Legnano, Italy, assignors to Carlo Erba S.p.A., Milan, Italy
No Drawing. Filed Feb. 8, 1971, Ser. No. 113,612
Claims priority, application Italy, Feb. 11, 1970, 20,461/70
Int. Cl. C07d 49/36
U.S. Cl. 260—299    4 Claims

ABSTRACT OF THE DISCLOSURE

The compound and methods of preparation of dibasic aluminum histidinate of the formula

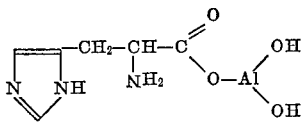

is disclosed. This compound is useful in antagonizing induced gastric ulcer formation.

---

The present invention relates to the novel salt, dibasic aluminum histidinate represented by the formula

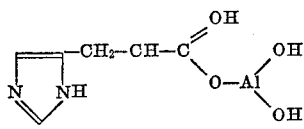

The resulting histidinate can be in the natural L-form, or the D-form or a mixture of these forms, particularly the racemic (DL) form.

The present invention also provides a process for preparing the salt comprising (a) reacting histidine with an aluminum alkoxide, or (b) reacting a salt of histidine with an aluminum salt. Both of these reactions are generally conducted in an aqueous alcohol solution. The nature of the resulting salt is determined mainly by the molar ratio between the histidine and the aluminum alkoxide or salt. Thus, it has been found that the use of 1 mole of histidine and 1 mole of aluminum alkoxide or ⅓ mole of aluminum salt produces the dibasic salt. The histidine starting material is an amino acid which is readily available in commerce or can be prepared according to the method of Foster and Shemin (Org. Syn. Coll. vol. II, 330, 1943). Conveniently, histidine can be employed in the L-form, the D-form or a mixture of these forms as the racemic mixture. Aluminum alkoxides, generally from 1 to 5 carbon atoms are available in commerce, as are the aluminum salts of strong inorganic acids; preferably aluminum halides, aluminum chlorides, aluminum sulfate, aluminum nitrate. Conversion of the histidine to the dibasic aluminum salt is conducted from about 10 to 100° C. and preferably from 40 to 80° C. Atmospheric pressures are conveniently used; however, higher and lower pressures may also be employed.

Among the alcohol solvents suitable for use according to the present invention are lower alkanols of 1–4 carbon atoms, such as methanol, ehtanol, propanol and isopropanol as well as other solvent alcohols inert to the reactants.

Dibasic aluminum histidinate is a white amorphous powder, insoluble in water and organic solvents, but soluble in mineral acids, such as for example, hydrochloric, sulphuric and nitric acid; its molecular weight is 275. Dibasic aluminum histidinate has been found to be effective in the treatment of gastritis and of gastric and duodenal ulcers. This was determined in the following manner: the in vivo acivity of dibasic aluminum histidinate was assessed in experimental animals by its ability to antagonize gastric ulcer formation induced by various methods, in order to choose those methods showing the best reproducibility associated with the most favorable dose/effect relationship (regression). The most satisfactory results were obtained with ulcers induced by the use of phenylbutazone, or glucose or caffeine.

Since dibasic aluminum distidinate is a salt, tests were conducted to determine which part of the activity was attributable to the aluminum radical and which to the histidine, and also to determine whether the activity of the salt differed from that of an aluminum hydroxide/histidine mixture. Data obtained in all the tests, as hereinafter described, showed that the activity of dibasic aluminum histidinate is greater than the sum of the activities of aluminum hydroxide and histidine when administered separately. Thus, it was concluded that, based on these studies, aluminum and histidine, when present together in the dibasic aluminum histidinate molecule, exert a synergistic effect in protecting gastric mucosa from ulcorogenic agents. This conclusion was checked with the phenylbutazone-induced ulcers by a direct comparison between the activity of dibasic aluminum histidinate and that of a mixture of aluminum hydroxide with histidine. The procedure and results thereof are as follows:

The method employed was in general that of Bonfils et al. (Compt. Rend. Soc. Biol., 1954, 148, 881). Rats, belonging to the CFE strain of the SPF breed, were placed two to a cage and starved for 15 hours with access only to water. Phenylbutazone (4-butyl-1,2-diphenyl-3,5-pyrazolidinedione, 80 mg./kg.) was administered orally to the rats at zero time, and subsequently the stated quantity of the test compound or mixture was also administered orally. The same treatment, with phenylbutazone and then the test preparation, was repeated after a period of two hours. After 6 hours from zero time, the animals were sacrificed by cutting their throats under chloroform anesthesia. The stomach, after removal at an autopsy examination, was prepared according to Hanson and Brodie (J. Appl. Physiol., 1969, 15, 291). Gastric lesions were assessed immediately after withdrawal of the stomachs and were rated and assigned values according to an arbitrary scale with values from 1 to 7, on the basis of models proposed by a number of authors (see, for example, Osterloh et al., Arzneim. Forsch., 1966, 16, 901). The assessment of the lesions was performed by investigators who were unaware of the treatment given to the animals. Care was also taken to randomize the treatments so as to eliminate a polarization of the data and to this end, each animal was assigned a number, and the key only disclosed after assessment of the various preparations were completed. Dose levels of 100 and 300 mg./kg. for dibasic aluminum histidinate and 300 and 900 mg./kg. for an equimolecular mixture of aluminum hydroxide and histidine were investigated. The preparations were first passed through a sieve (2900 holes/sq. cm.) and then suspended in distilled water before use.

Table A below summarizes the results of the investigation, which show that dibasic aluminum histidinate has an activity about 5 times that of the mixture of aluminum hydroxide and histidine.

TABLE A

| Ulcerogenic treatment | Dose, mg./kg. given twice orally | Protective treatment | Dose, mg./kg. given twice orally | Number of animals | Means of the assigned value (± standard error of the score) indicating the severity of the ulcerations |
|---|---|---|---|---|---|
| Phenylbutazone | 80 | | | 25 | 2.06±0.228 |
| Do | 80 | | | 25 | 5.70±0.299 |
| Do | 80 | Dibasic aluminium histidinate | 100 | 25 | 4.34±0.310 |
| Do | 80 | ___do___ | 300 | 25 | 2.26±0.260 |
| Do | 80 | Mixture of aluminium hydroxide and histidine. | 300 | 25 | 5.10±0.252 |
| Do | 80 | ___do___ | 900 | 25 | 3.56±0.270 |

Table B relates to the variance analysis made according to a factorial design for biological assay, based on two parallel lines. Since the statistical comparison gave satisfactory results, the ratio of activity between aluminum histidinate and the mixture of aluminum hydroxide with histidine was calculated and found to be 5.61 with a fiducial limit of 3.91–8.03 for probability (P) of 0.05.

TABLE B

| Source of variation | Degree of freedom | Variance | F | Result | Probability |
|---|---|---|---|---|---|
| Days | 4 | 7.7433 | 4.58 | HS | <0.01 |
| Control and phenylbutazone versus treated animals. | 1 | 0.1408 | <1 | NS | >0.05 |
| Drugs | 1 | 26.5225 | 15.68 | HS | <0.01 |
| Regression | 1 | 81.9025 | 48.43 | HS | <0.01 |
| Parallelism | 1 | 1.8225 | 1.08 | NS | >0.05 |
| Groups x days | 20 | 0.9533 | <1 | NS | >0.05 |
| Error | 140 | 1.6912 | | | |

The activity ratio of the dibasic aluminum histidinate salt as compared to the mixture of aluminum hydroxide and histidine was calculated as follows:

Activity ratio of
$$\frac{\text{Dibasic aluminum histidinate}}{\text{Mixture of aluminum hydroxide and histidine}} = 5.61$$

(Fiducial limits: 3.91–8.03 for P=0.05)

The invention also provides pharmaceutical compositions comprising dibasic aluminum histidinate and a pharmaceutically acceptable carrier or diluent.

As used herein the term "pharmaceutical carrier" denotes a solid or liquid devoid of significant anti-inflammatory activity composed of a single substance or a number of substances which may be solids and liquids each of which is less toxic than an equal weight of the dibasic aluminum histidinate present in the composition when measured in the same animal host using the same method of administration, vehicle, etc. The compositions can be in the form of tablets, lozenges, capsules (either liquid or dry filled), dragées, pills, powders and aqueous and non-aqueous solutions or suspensions. Some examples of the substances which can serve as pharmaceutical carriers in the compositions of the invention are gelatin capsules; sugars such as lactose and sucrose; starches, such as corn starch and potato starch; cellulose derivatives, such as sodium carboxymethyl cellulose, ethyl cellulose, methyl cellulose, cellulose acetate phathalate; gelatin; talc; stearic acid; magnesium stearate; vegetable oils, such as peanut oil, cottonseed oil, sesame oil, olive oil, and oil of theobroma; propylene glycol; glycerin; sorbitol; polyethylene glycol; water; agar alginic acid; isotonic saline; and phosphate buffer solutions, as well as other non-toxic compatible substances used in pharmaceutical formulations.

From the results of clinical trials the suggested dosage ranges of the dibasic aluminum histidinate salts are of the order of about 400 to 1,200 mg. pro dose.

The invention is further illustrated by the following examples. Unless otherwise indicated, all parts and percentages are by weight.

EXAMPLE 1

Freshly distilled aluminum isopropoxide (20.42 g.) and dry isopropanol (200 ml.) were heated in a round-bottomed, three-neck flask (500 ml.) having a mechanical stirrer, thermometer, and reflux condenser (fitted with a calcium chloride tube) at 40 to 45° C., under atmospheric pressure, then treated with L-histidine base (15.51 g.), agitated continuously at 50° C., and left at 50° C. for 10 minutes. Water (3.6 g.) was then added dropwise. The temperature rose spontaneously to about 55 to 60° C. The voluminous white precipitate which formed was stirred for 2 hours at 55–60° C. and then stirred for 1 hour at room temperature. The product was collected on a Büchner funnel and dried at 50° C. and 30 mm. Hg for 4 hours. The dry product was ground to a fine powder to give dibasic aluminum L-histidinate (23 g.) having a water content of 7.5%. [Found (corrected for the dry product): C, 33.04; N, 19.3; Al, 12.7%. Theoretical $C_6H_{10}N_3O_4Al$: C, 33.49; N, 19.54; Al, 12.54%.]

EXAMPLE 2

Aluminum isopropoxide (10.2 g.) was first melted in a round-bottomed flasked fitted with an efficient stirrer then cooled to 80 to 88° C., and under atmospheric pressure treated with L-histidine base (7.76 g.), isopropanol (10 ml.), and then deionized water (1.8 g.). Stirring was continued at 55 to 60° C. for 5 hours. The mixture was then dried in a crystallizer at 70° C. under 30 mm. Hg. The dried product was ground to a fine powder to give dibasic aluminum L-histidine (10.7 g.; water content 5.11%) having the same physicochemical characteristics as the product of Example 1. [Found (corrected for the dry product): C, 34.4; N, 19.4; Al, 12.1; histidine, 74% Theoretical $C_6H_{10}N_3O_4Al$: C, 33.49; N, 19.54; Al, 12.54; histidine 71.65%.]

EXAMPLE 3

Methanol (200 ml.) in a round-bottomed flask (500 ml.) was treated at atmospheric pressure by cooling with anhydrous aluminum chloride (6.6 g.) to about 10° C.

and then adding dropwise, in order, with stirring with L-histidine (23.2 g.), sodium hydroxide (6 g.), water (12.5 ml.), and methanol (50 ml.). The white precipitate which formed was stirred at 60° C. for one hour then treated with water (50 ml.) and continuously agitated at 60° C. for 4 hours. The cooled suspension was filtered; the product was dried at 50° C. under reduced pressure of 30 mm. Hg to give dibasic aluminum L-histidinate (13 g.).

EXAMPLE 4

Proceeding as in Example 1, and using aluminum isopropoxide (20.42 g.), isopropanol (200 ml.), DL-histidine base (15.51 g.), and water (3.6 g.), dibasic aluminum DL-histidinate (23 g.) was obtained. The D-histidinate isomer can be obtained in the same manner by starting with D-histidine base.

EXAMPLE 5

Proceeding as in Example 2, and using molten aluminum isopropoxide 10.2 g.), DL-histidine (7.76 g.), isopropanol (10 ml.), and water (1.8 g.), dibasic aluminium DL-histidinate (10 g.) was obtained. The D-histidinate isomer can be obtained in the same manner by starting with D-histidine base.

EXAMPLE 6

Proceeding as in Example 3, and using anhydrous aluminum chloride (6.6 g.) methanol (200 ml.), DL-histidine (23.2 g.), sodium hydroxide (6 g.), and water (12.5 g.), dibasic aluminum DL-histidinate (12 g.), was obtained. The D-histidinate isomer can be obtained in the same manner by starting with D-histidine base.

What is claimed is:
1. Dibasic aluminum histidinate of the formula

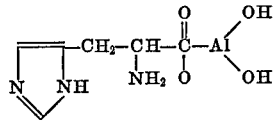

2. The compound as claimed in claim 1 wherein the said dibasic aluminum histidinate is in the L-form.
3. The compound as claimed in claim 1 wherein the said dibasic aluminum histidinate is in the D-form.
4. The compound as claimed in claim 1 wherein the said dibasic aluminum histidinate is in the DL-form.

References Cited
UNITED STATES PATENTS 2,761,867   9/1956   Mecca _____ 260—299
2,844,551   7/1958   Orthner et al. _____ 260—299

RICHARD J. GALLAGHER, Primary Examiner

U.S. Cl. X.R.
424—245

UNITED STATES PATENT OFFICE
CERTIFICATE OF CORRECTION

Patent No. 3,746,700  Dated July 17, 1973

Inventor(s) FRANCO PARISI, ET. AL.

It is certified that error appears in the above-identified patent and that said Letters Patent are hereby corrected as shown below:

Column 1, line 35, and claim 1, line 2, cancel the formula and insert the following:

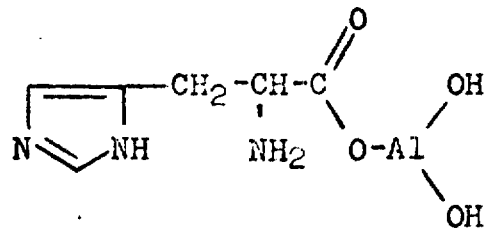

Column 3, line 74, "phathalate" should read -- phthalate -- .
Column 4, line 63, Example 2, "L-histidine" should read -- L-histidinate -- .

Signed and sealed this 6th day of August 1974.

(SEAL)
Attest:

McCOY M. GIBSON, JR.           C. MARSHALL DANN
Attesting Officer              Commissioner of Patents